United States Patent [19]

Harakon et al.

[11] Patent Number: 4,890,659
[45] Date of Patent: Jan. 2, 1990

[54] REINFORCING LAMINATE FOR TIRE AND HEAVY DUTY PNEUMATIC RADIAL TIRE USING THE SAME

[75] Inventors: Katsuyuki Harakon, Higashiyamato; Shigeki Yamada, Tokyo, both of Japan

[73] Assignee: Bridgestone Corporation, Tokyo, Japan

[21] Appl. No.: 186,405

[22] Filed: Apr. 26, 1988

[30] Foreign Application Priority Data

Apr. 28, 1987 [JP] Japan .................................. 62-103358
May 15, 1987 [JP] Japan .................................. 62-118157

[51] Int. Cl.$^4$ ............................................................. B60C 9/22
[52] U.S. Cl. ..................................... 152/531; 152/527
[58] Field of Search ................ 428/295; 152/526, 527, 152/531, 533, 538, 548, 556, 560

[56] References Cited

U.S. PATENT DOCUMENTS

| | | | |
|---|---|---|---|
| 826,739 | 7/1906 | Patterson | 428/295 X |
| 996,351 | 6/1911 | Lambright | 152/526 X |
| 2,338,447 | 1/1944 | Lenart et al. | 428/295 X |
| 2,792,319 | 5/1957 | Fihe | 428/295 X |
| 3,500,888 | 3/1970 | Boileau | 152/556 |
| 3,692,080 | 9/1972 | Boileau | 152/527 |
| 3,783,926 | 1/1974 | de Zarauz | 152/556 |
| 4,120,339 | 10/1978 | Shichman | 152/526 |
| 4,445,560 | 5/1984 | Musy | 152/531 X |
| 4,749,017 | 6/1988 | Loesch | 152/527 |

FOREIGN PATENT DOCUMENTS

| | | | |
|---|---|---|---|
| 3734700 | 4/1988 | Fed. Rep. of Germany | 152/531 |
| 56-71604 | 6/1981 | Japan | 152/531 |
| 58-128903 | 8/1983 | Japan | 152/526 |
| 61-119405 | 6/1986 | Japan | 152/526 |
| 1067755 | 5/1967 | United Kingdom | 152/527 |

*Primary Examiner*—Raymond Hoch
*Attorney, Agent, or Firm*—Sughrue, Mion, Zinn, Macpeak & Seas

[57] ABSTRACT

A reinforcing laminate for use in a carcass or a belt of a heavy duty pneumatic radial tire comprises plural reinforcing layers piled one upon the other, each containing cords substantially arranged in parallel to each other and covered with a coating rubber, wherein the cords of the adjoining reinforcing layers are arranged in parallel to each other and the pitch between the cords in one of the reinforcing layers is shifted by an approximately half pitch from that of the other reinforcing layer.

2 Claims, 5 Drawing Sheets

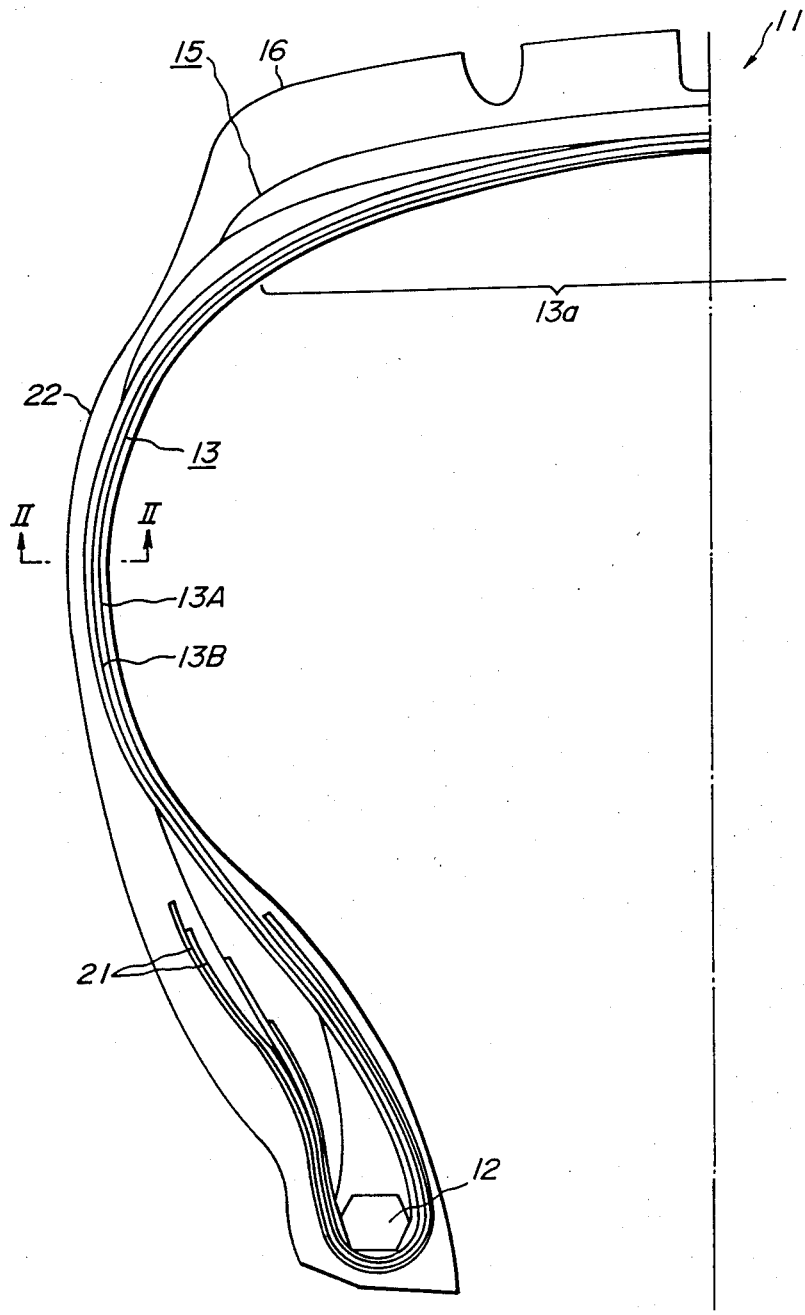
FIG_1

FIG_2
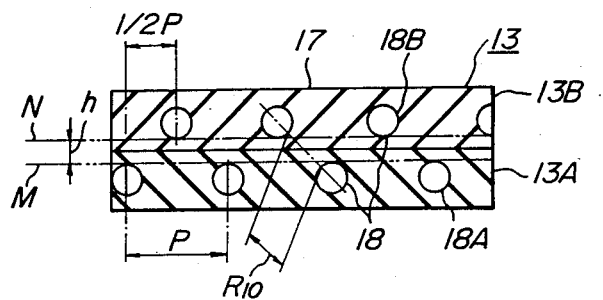
FIG_3
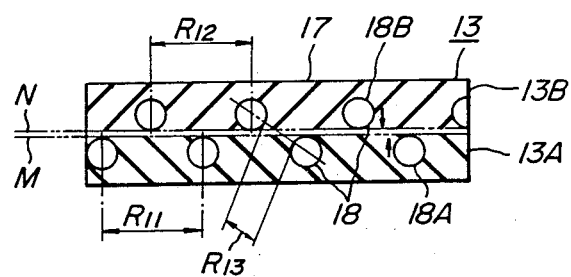

FIG_4
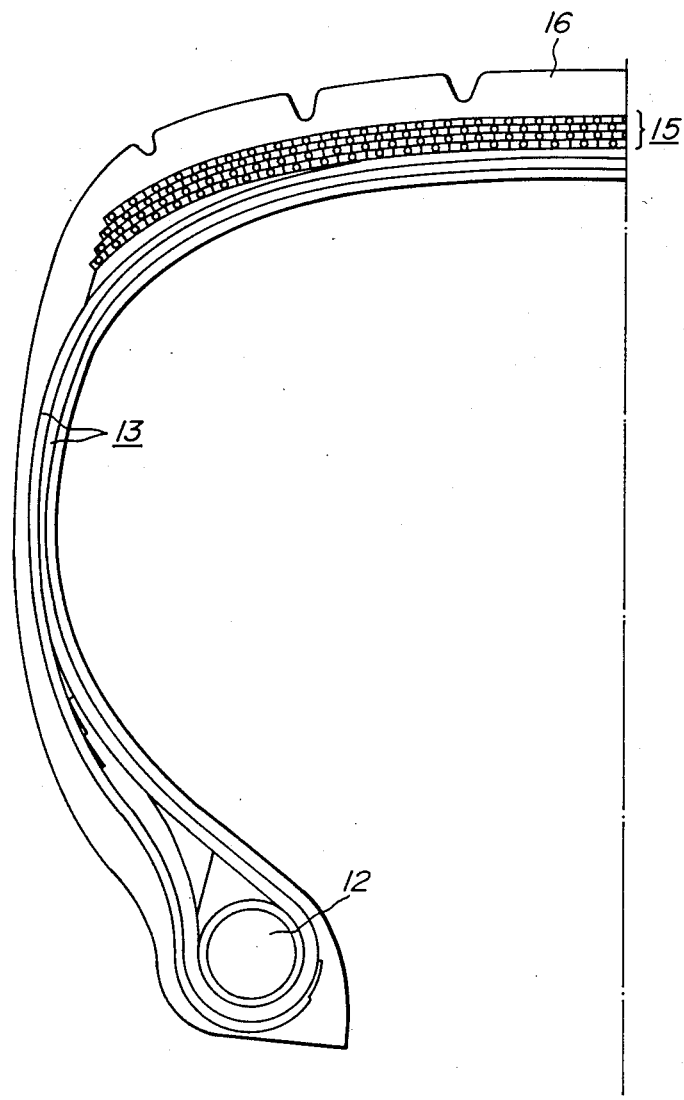

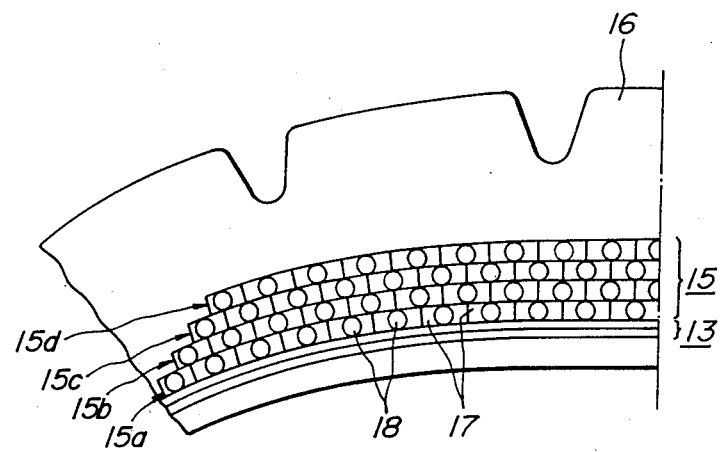
FIG_5

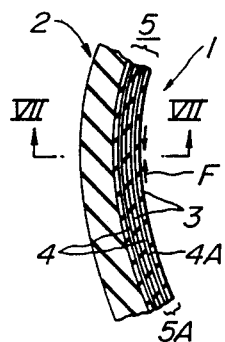
FIG_6
PRIOR ART
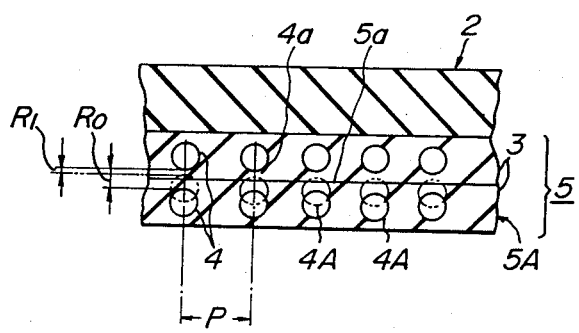
FIG_7
PRIOR ART
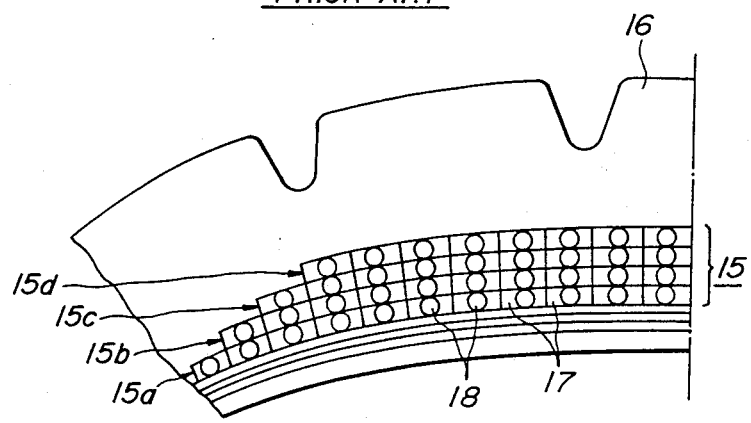
FIG_8
PRIOR ART

REINFORCING LAMINATE FOR TIRE AND HEAVY DUTY PNEUMATIC RADIAL TIRE USING THE SAME

BACKGROUND OF THE INVENTION

1. Field of the Invention

This invention relates to a reinforcing laminate for tire and a heavy duty pneumatic radial tire using the same. More particularly this invention relates to an improvement in the durability of carcass ply and belt layer using high elasticity cords in the radial tire for an airplane running at high speed under high internal pressure and high loading.

2. Related Art Statement

The conventional heavy duty pneumatic radial tire illustrated in FIGS. 6-7, for example, an airplane radial tire 1 comprises a carcass 5 of plural carcass plies each containing organic fiber cords 4 sustantially arranged in parallel to each other in the axial direction of the tire and covered with a coating rubber 3 as a part of a side portion 2. A belt of plural belt layers superimposed about a crown portion of the carcass 5 (not shown) and containing cords is arranged circumferentially of the tire or at a small angle with respect to the circumferential direction of the tire. The cord 4 in the carcass 5 is generally a nylon cord. Recently, an organic fiber cord having a high modulus of elasticity such as Kevlar cord (trade name) or the like is used as the cord 4. As shown in FIG. 7, the cords 4 in the two carcass plies of the carcass 5 are used so as to pile one upon the other at the same pitch P. When such an airplane radial tire is run at a high speed under a high internal pressure and a high loading, the deflecting deformation of the tire during the rotation under loading is large and corresponds to about 25%~40% of a sectional height of the tire. As a result, the deformation of the side portion 2 in the tire becomes large and particularly the bending deformation thereof is very large, resulting in the occurrence of a large repetitive compression strain F inside the carcass 5.

As shown in FIG. 8, the belt 15 is composed of a four layer lamination structure consisting of a first belt layer 15a to a fourth belt layer 15d. In the formation of the belt 15, a single cord 18 covered with a coating rubber 17 is first helically wound from an end of the first belt layer 15a and arranged in parallel to each other in the circumferential direction.

Then, the second belt layer 15b is piled on the first belt layer 15a, wherein the initial end of the rubber coated cord of the second belt layer 15b is placed just on the second wound rubber coated cord of the first belt layer 15a viewed from the initial end thereof. In this way, the first belt layer 15a to fourth belt layer 15d are successively piled one upon the other to form the belt 15.

As a result, the cords 18 in the belt are in an up and down laminated state between the adjoining belt layers (in the radial direction of the tire).

For instance, when the cord 4 in the carcass 5 as shown in FIG. 6 is a high elasticity cord having a less elongation such as steel cord or Kevlar cord, the side portion 2 of the radial tire 1 is largely deformed to cause the bending deformation of the carcass 5. Particularly, the cords 4 of the inner carcass ply 5A in the carcass 5 are subjected to a large repetitive compression strain F, whereby the fatigue of the cord 4 is accelerated to decrease the strength of the cord 4. Consequently there is a problem that the fatigue life of the cord largely reduces. Furthermore, as shown in FIG. 7, the distance $R_0$ between the outer carcass ply 5B and the inner carcass ply 5A in the carcass 5 reduces to a distance $R_1$ and consequently a large shearing strain is caused in a boundary 5a between the carcass plies and in a space 4a between the cords of the carcass plies to promote the peeling between the cord 4 and the coating rubber 3 or the compression fatigue of the rubber 3, resulting in the considerable degradation of the fatigue life of the carcass.

In the belt, the cords of the adjoining belt layers are plied one upon the other in up and down directions and made from polyaramide fiber having a high modulus of elasticity or the like. When the tire is run under loading, the belt has no room for mitigating a shock from exterior and consequently there is a fear of weakening the belt to the external shock.

When this type of the heavy duty pneumatic radial tire is run at a high speed while being subjected to a large tire deformation, there have been made various studies with respect to the magnitude of bending deformation and compression strain of the cord in the carcass, the magnitude of shearing strain between carcass plies and between the cords, the fatigue life of the carcass, the rubber thickness of the carcass ply, the arrangement of cords in the carcass ply and the like. Consequently the following has been confirmed. That is, as the rubber thickness between the carcass plies increases and also the distance between cords in the carcass ply increases, the shearing strain between the cords and between the carcass plies reduces, but the tire weight and quantity of heat build-up undesirably increase. Particularly, when the high elasticity cord is used, the difference in tension between the inner carcass ply and the outer carcass ply increases and the fatigue of the inner carcass ply becomes larger. On the other hand, as the distance between cords in the carcass ply becomes large, the shearing strain between the cords becomes small, but the strength of the carcass ply lowers, resulting in the increase of the carcass ply number. This brings about the increase of the tire weight and amount of heat build-up to degrade the durability of the tire.

SUMMARY OF THE INVENTION

It is, therefore, an object of the invention to provide a heavy duty pneumatic radial tire having an improved durability wherein the cord arrangement in the reinforcing laminate for use in the carcass or the belt of the tire using the organic fiber cord, particularly high elasticity cord is regulated to reduce strain produced about the cord.

According to a first aspect of the invention, there is the provision of a reinforcing laminate for tire comprising plural reinforcing layers piled one upon the other, each of which layers containing cords substantially arranged in parallel to each other and covered with a coating rubber; and the cords of the adjoining reinforcing layers being arranged in parallel to each other and a center axis of the cord in one of the reinforcing layers being axially shifted by an approximately one half pitch from that of the other reinforcing layer in a transversely sectional direction of the cord.

According to a second aspect of the invention, there is the provision of a heavy duty pneumatic radial tire comprising a pair of bead portions, a carcass extending between said bead portions and comprised of plural carcass plies each containing cords substantially arranged in parallel to the axial direction of the tire and covered with a coating rubber, and a belt superimposed about a crown portion of said carcass and composed of at least two belt layers each containing a cord or several cords helically wound substantially in parallel to equator of the tire and covered with a coating rubber, characterized in that said carcass or further said belt is comprised of a reinforcing laminate comprising plural reinforcing layers piled one upon the other, each of which layers containing cords substantially arranged in parallel to each other and covered with a coating rubber; and the cords of the adjoining reinforcing layers being arranged in parallel to each other and a center axis of the cord in one of the reinforcing layers being axially shifted by an approximately one half pitch from that of the other reinforcing layer in a transversely sectional direction of the cord.

In a preferred embodiment of the invention, the lower face of the upper-side reinforcing layer in the reinforcing laminate is always contacted with the upper face of the lower-side reinforcing layer so as not to get the cords of each reinforcing layer into the other reinforcing layer.

BRIEF DESCRIPTION OF THE DRAWINGS

The invention will be described with reference to the accompanying drawings, wherein:

FIG. 1 is a partly sectional view of a first embodiment of the heavy duty pneumatic radial tire according to the invention;

FIG. 2 is a partially enlarged sectional view taken along a line II—II of FIG. 1;

FIG. 3 is a schematically sectional view illustrating the behavior of the laminate of FIG. 2;

FIG. 4 is a partly sectional view of a second embodiment of the heavy duty pneumatic radial tire according to the invention;

FIG. 5 is a partially enlarged sectional view of a main part of FIG. 4;

FIG. 6 is a sectional view of a main part of the conventional heavy duty pneumatic radial tire;

FIG. 7 is a partially enlarged sectional view taken along a line VII—VII of FIG. 6; and FIG. 8 is a partially enlarged sectional view of a main part of another conventional heavy duty pneumatic radial tire.

DESCRIPTION OF THE PREFERRED EMBODIMENTS

In the reinforcing laminate according to the invention, the cords of the upper-side reinforcing layer are shifted by about one half pitch from the cords of the adjoining lower-side reinforcing layer, so that the distance between the cords of the upper and lower reinforcing layers is possible to be made large, whereby the strain of rubber produced between the cords of the reinforcing layers due to the bending deformation or external shock can be reduced.

Furthermore, when such a reinforcing laminate comprised of two reinforcing layers is applied to the carcass of the heavy duty pneumatic radial tire according to the invention, the cords of the inner carcass ply and the outer carcass ply are shifted by about ½ pitch with each other, so that when the carcass using high elasticity cords is subjected to a large bending deformation, the cords of the outer carcass ply approach a space between the cords of the inner carcass ply and also the cords of the inner carcass ply approach a space between the cords of the outer carcass ply. Consequently the compression deformation of the cord in the inner carcass ply becomes small. In addition, the distance between the cord of the outer carcass ply and the cord of the inner carcass ply becomes large as compared with the case of the conventional carcass and hence the shearing strains between the carcass plies and between the cords become small.

Moreover, the lower face of the outer carcass ply in the carcass always contacts with the upper face of the inner carcass ply so as not to get the cords of each carcass ply into the other carcass ply, so that even when the cords of the outer and inner carcass plies are largely deformed by the large bending deformation of the carcass, the shearing strains between the carcass plies and between the cords never become excessively large and the deformation fatigue of the carcass is largely reduced.

On the other hand, when the reinforcing laminate according to the invention is applied to the belt of the heavy duty pneumatic radial tire, since there is a phase difference between the cords of the adjoining belt layers, if the tire is subjected to a shock from exterior, the high elasticity cords get into upper and lower adjoining coating rubbers, whereby the shock can be mitigated.

FIGS. 1 and 2 illustrate a first embodiment of the heavy duty pneumatic radial tire according to the invention. This tire 11 is an airplane radial tire having a tire size of H46×18.0 R20 and comprises a pair of bead rings 12, a carcass 13 comprised of two carcass plies 13A, 13B toroidally extending between the bead rings 12 and wound around each of the bead rings 12 from the inside of the tire to the outside thereof, a belt 15 superimposed about a crown portion 13a of the carcass 13 and composed of plural belt layers and a tread 16 covering the outer portion of the belt 15. Each of the carcass plies 13A, 13B in the carcass 13 contains Kevlar cords 18 of 1500 d/2 arranged at an angle of 90° with respect to the circumferential direction of the tire or substantially in parallel to the axial direction of the tire and covered with a coating rubber 17. As seen from FIG. 2, the carcass 13 is comprised of the inner carcass ply 13A arranged inward in the radial direction of the tire and the outer carcass ply 13B located outside the inner carcass ply 13A. Furthermore, as shown in FIG. 2, the cords 18A of the inner carcass ply 13A are arranged so as to shift by about ½ P (half pitch) from the cords 18B of the outer carcass ply 13B, and the inner carcass ply 13A and the outer carcass ply 13B are piled so that a distance h between a plane M including a common tangent to the cords 18A of the inner carcass ply 13A and facing to the outer carcass ply 13B and a plane N including a common tangent to the cords 18B of the outer carcass ply 13B and facing to the inner carcass ply 13A is 0.3 mm.

The belt 15 is comprised of seven belt layers each containing a Kevlar cord of 1500 d/3 helically wound in the circumferential direction of the tire and in parallel to each other. Numeral 21 is a chafer arranged outside the carcass so as to surround the bead ring 12. Numeral 22 is a sidewall rubber. The construction other than the above is the same as in the conventional airplane radial tire.

The function of the invention will be described below.

In the airplane radial tire 11 according to the invention, the outer carcass ply 13B and the inner carcass ply 13A in the carcass 13 are arranged so as to have a distance $R_{10}$ between the cord 18B and the cord 18A by shifting the pitch between the cords 18B of the outer carcass ply 13B by about ½ P from the pitch between the cords 18A of the inner carcass ply 13A, so that when the carcass 13 is subjected to a large bending deformation through the deflecting deformation of the radial tire 11, the cords 18B of the outer carcass ply 13B and the cords 18A of the inner carcass ply 13A move to approach toward the spaces between the cords 18A and between the cords 18B, respectively, as shown by an arrow in FIG. 3. On the other hand, the cords 18A and 18B are still maintained so as not to protrude from the planes M and N, respectively, so that sufficient distances $R_{11}$, $R_{12}$ and $R_{13}$ are held between the cords 18A, between the cords 18B and between the cord 18A and the cord 18B, respectively. Therefore, the compression strains of the cords 18A and 18B are very small and also the shearing strains of rubber between the cords 18A, between the cords 18B and between the cord 18A and the cord 18B are very small. As a result, the fatigue between these cords and between the carcass plies becomes small and consequently the fatigue life as well as the durability are largely increased.

The effect of the invention will be described with reference to the following two test tires A and B below.

The test tire A is the same as in the first embodiment of FIG. 1, while the test tire B is the conventional tire shown in FIGS. 6 and 7, wherein the cords of the outer carcass ply are placed just on the cords of the inner carcass ply at the same pitch.

Each of these test tires is placed on an ordinary indoor drum tester and then run under a normal loading over a distance of 5,000 km. After the running, the cords of the inner and outer carcass plies are taken out from the sidewall of these test tires A and B and the strength thereof is measured, which is compared with the strength before the running to determine the retention of cord strength (%). Furthermore, the presence or absence of rubber cracking or the like in the vicinity of cords of the inner and outer carcass plies is observed visually. The test results are shown in the following table.

|  |  | Test tire A Example | Test tire B Comparative Example |
|---|---|---|---|
| Retention of cord strength (%) | cord of inner carcass ply | 95 | 78 |
|  | cord of outer carcass ply | 95 | 90 |
| Presence or absence of cracking |  | substantially absence | presence of cracks near cords |

As seen from the above table, when the test tire A is compared with the test tire B, the retention of cord strength is very high and the fatigue life of the cord is largely improved. Furthermore, the rubber cracking between the cords and between the carcass plies is hardly caused, so that the shearing strain of rubber is reduced to largely enhance the fatigue life of rubber.

FIG. 4 illustrates a second embodiment of the heavy duty pneumatic radial tire using the reinforcing laminate according to the invention as a belt 15. FIG. 5 is a partially enlarged and schematically sectional view of the crown portion in the tire shown in FIG. 4.

The belt 15 is comprised of four belt layers 15a to 15d.

In the formation of the belt 15, the first belt layer 15a is first formed by substantially helically winding a rubber coated cord obtained by covering a single cord 18 with a coating rubber 17 from an end of the first belt layer 15a toward the other end thereof with respect to the circumferential direction of the tire.

Then, the second belt layer 15b is formed on the first belt layer 15a, wherein the starting end of the rubber coated cord for the second belt layer 15b locates at a middle between the first wound cord and the second wound cord of the first belt layer 15a.

Further, the same procedure as described above is repeated to form third and fourth belt layers 15c and 15d.

As a result, the cords between the adjoining belt layers are in a phase shifted state in up and down directions (or in the radial direction of the tire) without placing the cords of the upper-side belt layer just above the cords of the lower-side belt layer.

The fatigue resistance was measured by using two test tires C and D. The test tire C is a radial tire shown in FIGS. 4 and 5 and the test tire D is the conventional radial tire shown in FIG. 8. In these test tires, the polyaramide fiber cord (Kevlar cord) of 3000 d/3 was used as a cord for the carcass ply and the belt layer.

The fatigue resistance was evaluated by measuring a residual strength of cord after the completion of TSO-C62C test defined in NASA.

As a result, the fatigue resistance of the test tire C is 135 as an index value on the basis that the test tire D is 100.

As mentioned above, according to the invention, not only the strain of cord in the lower reinforcing layer or the inner carcass ply but also the strain of rubber between the cords and between the layers or between the carcass plies can be reduced by controlling the arrangement of cords in the reinforcing laminate using organic fiber cords, particularly high elasticity cords or in the carcass using the laminate, whereby the fatigue life of the reinforcing layer or the carcass ply can largely be prolonged to considerably increase the durability.

Furthermore, when the reinforcing laminate is applied to the belt of the tire, even if the tire is subjected to shock from the exterior, such a shock can be mitigated to improve the shock resistance.

What is claimed is:

1. A heavy duty pneumatic radial tire comprising: a pair of bead portions, a carcass extending between said bead portions, a carcass extending between said bead portions and comprised of carcass plies each containing cords substantially arranged in parallel to the axial direction of the tire and covered with a coating rubber, and a belt superimposed about a crown portion of said carcass and composed of at least two belt layers each containing at least one cord helically wound substantially in parallel to the equator of the tire and covered with a coating rubber, said belt comprising a reinforcing laminate having plural reinforcing layers piled one upon the other, each of said reinforcing layers containing the same material and high elasticity cords substantially arranged in parallel to each other and covered with a coating rubber; the cords of the adjoining reinforcing layers being arranged in parallel to each other and a center axis of the cords in one of the reinforcing layers being axially shifted by approximately one-half pitch form that of the other reinforcing layer in a transversely sectional direction of the cord; and a lower face of an upper-side reinforcing layer in said reinforcing laminate always contacting an upper face of a lower-side reinforcing layer in said laminate wherein cords of each reinforcing layer do not penetrate into the other reinforcing layer.

2. The heavy duty pneumatic radial tire according to claim 1, wherein said cords in said reinforcing laminate are made from aromatic polyamide.

* * * * *